Sept. 9, 1958   F. WEISSER   2,851,563
EXPLOSION-PROOF CASING FOR ELECTRICAL SWITCH
Filed Sept. 6, 1955

INVENTOR
Fritz Weisser

United States Patent Office 2,851,563
Patented Sept. 9, 1958

2,851,563

EXPLOSION-PROOF CASING FOR ELECTRICAL SWITCH

Fritz Weisser, Deizisau, Wurttemberg, Germany, assignor to R. Stahl Maschinenfabish, Stuttgart, Germany, a corporation of Germany Application September 6, 1955, Serial No. 532,559

2 Claims. (Cl. 200—168)

The invention relates to casings for switches, and more particularly, to casings for rendering electric switches explosion-proof.

It is important in encasing electric switches in order to render them explosion-proof that the space between any two parts of the casing be kept as small as possible, so as to prevent an explosion within the casing from penetrating between these parts.

The primary object of the present invention is to provide a casing for electrical switches in which the danger of explosions escaping from the casing is substantially eliminated.

Another object of the invention is to provide such a casing, formed of two substantially similar parts, which are capable of being produced in the same die, with the result that the manufacture of the casing is very economical.

Further objects and advantages of the invention will appear more fully from the following description, particularly when taken in conjunction with the accompanying drawings which form a part thereof.

Figure 1:
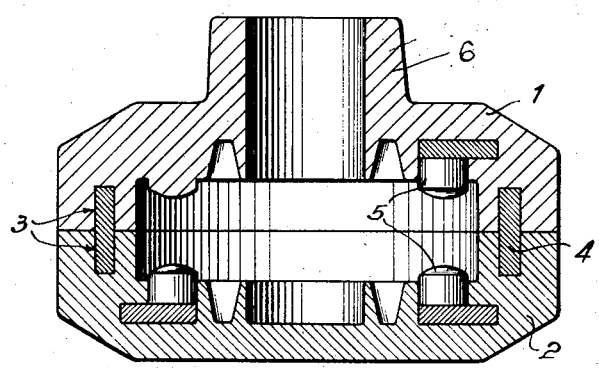
Fig. 1 shows in cross section a switch casing embodying the invention.
Figure 2:
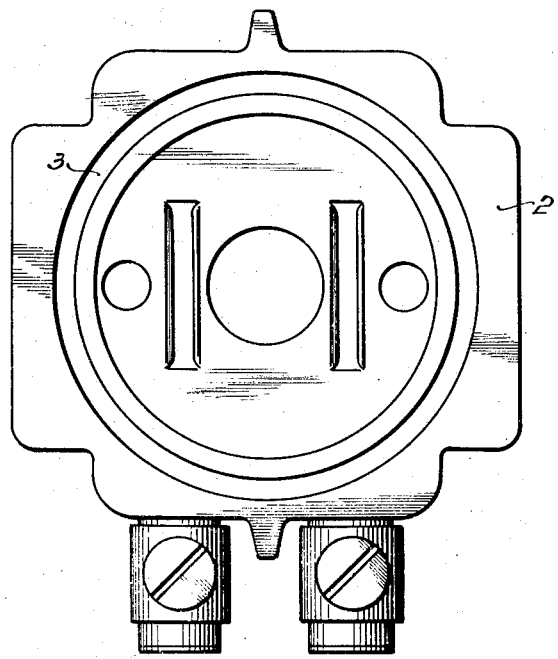
Fig. 2 is a top plan view of the bottom casing portion.

As shown in the drawing, the casing includes a top part 1 and a bottom part 2, secured together in any suitable manner. These parts have mating faces in which are formed grooves 3 of the same diameter and width. Within these grooves, when the parts are assembled, is a tightly fitting ring 4. This ring ensures that the joint between the two casing parts is substantially completely sealed, so that no escape of the explosion between the parts is possible.

The internal shape of the two parts is substantially the same, so that they can be made in the same mold with only slight changes in the included parts and in the pressing die. For example, the upward projection 6 of the top part 1 can be formed instead of the solid flat part of bottom part 2 by merely exchanging one element in the die. Likewise, contacts 5 may be included or omitted during the moulding operation, as desired. In other respects, however, the two parts are of identical shape, each being hollow, so that parts of the switch are included within each of the casing parts.

While I have described herein one embodiment of my invention, I wish it to be understood that I do not intend to limit myself thereby except within the scope of the claims hereto or hereinafter appended.

I claim:

1. An explosion-proof casing for electric switches comprising upper and lower parts having plane mating engaging faces, each of said faces having an annular groove therein, said grooves being of equal diameter and width, and a closed round rigid ring tightly engaging in both said grooves.

2. An explosion-proof casing for electric switches comprising upper and lower parts having plane mating engaging faces, each of said faces having an annular groove therein, said grooves being of equal diameter and width, and a closed round ring tightly engaging in both said grooves, said parts each being hollow and having substantially the same internal shape and each containing switch contacts within the hollow portion thereof.

References Cited in the file of this patent

UNITED STATES PATENTS

| | | |
|---|---|---|
| 1,104,007 | Schaefer | July 21, 1914 |
| 2,723,328 | Verkuil | Nov. 8, 1955 |